United States Patent
Stelzer et al.

(10) Patent No.: US 9,507,014 B2
(45) Date of Patent: Nov. 29, 2016

(54) METHOD AND DEVICE FOR DETECTING A ROTATING WHEEL

(75) Inventors: Andreas Stelzer, Linz (AT); Markus Pichler, Linz (AT); Clemens Pfeffer, Linz (AT); Oliver Nagy, Vienna (AT); Werner Scheiblhofer, Linz (AT); Reinhard Feger, Scheffau (AT)

(73) Assignee: Kapsch TrafficCom AG, Vienna (AT)

( * ) Notice: Subject to any disclaimer, the term of this patent is extended or adjusted under 35 U.S.C. 154(b) by 448 days.

(21) Appl. No.: 14/127,875

(22) PCT Filed: Jun. 19, 2012

(86) PCT No.: PCT/EP2012/061645
§ 371 (c)(1),
(2), (4) Date: Apr. 4, 2014

(87) PCT Pub. No.: WO2012/175470
PCT Pub. Date: Dec. 27, 2012

(65) Prior Publication Data
US 2014/0218227 A1 Aug. 7, 2014

(30) Foreign Application Priority Data

Jun. 21, 2011 (EP) .................................... 11450079
Jun. 21, 2011 (EP) .................................... 11450080

(51) Int. Cl.
*G01S 7/41* (2006.01)
*G01S 13/04* (2006.01)
(Continued)

(52) U.S. Cl.
CPC ............... *G01S 7/415* (2013.01); *G01S 13/04* (2013.01); *G01S 13/58* (2013.01); *G01S 13/589* (2013.01); *G01S 13/91* (2013.01); *G01S 17/88* (2013.01); *G08G 1/04* (2013.01)

(58) Field of Classification Search
CPC .......... G08G 1/01; G08G 1/04; G08G 1/065; G08G 1/015; G01S 17/88; G01S 7/02; G01S 7/41; G01S 7/415; G01S 13/02; G01S 13/50; G01S 13/58; G01S 13/589; G01S 13/88; G01S 13/91; G01S 13/04; B26D 5/20; B26D 5/30; B26D 5/32
See application file for complete search history.

(56) References Cited

U.S. PATENT DOCUMENTS 4,947,353 A * 8/1990 Quinlan, Jr. ............ G08G 1/015
235/384
4,994,681 A * 2/1991 Mann ...................... G01S 17/88
250/559.3

(Continued)

FOREIGN PATENT DOCUMENTS

| DE | 19928624 A1 | 1/2001 |
|---|---|---|
| DE | 102008037233 A1 | 3/2010 |
| WO | 2012175470 A1 | 12/2012 |

OTHER PUBLICATIONS

International Search Report received for PCT Patent Application No. PCT/EP2012/061645, mailed on Sep. 3, 2012, 3 pages.

(Continued)

*Primary Examiner* — Bernarr Gregory
(74) *Attorney, Agent, or Firm* — Fiala & Weaver P.L.L.C.

(57) ABSTRACT

A method is described for detecting a rotating wheel of a vehicle that is travelling on a roadway in a travel direction, the wheels of which are at least partially exposed laterally, the method comprising: emitting an electromagnetic measurement beam having a known temporal progression of its frequency onto a first section above the roadway in a direction in a slant with respect to the vertical and normally or at a slant with respect to the travel direction; receiving a reflected measurement beam and recording the temporal progression of its frequencies, relative to the known progression, as a reception frequency mixture progression; and detecting a frequency band, which is continuously inclining or declining over a period of time, in the reception frequency mixture progression as a wheel. A device for conducting the method is also described.

20 Claims, 6 Drawing Sheets

(51) Int. Cl.
*G01S 13/58* (2006.01)
*G01S 13/91* (2006.01)
*G01S 17/88* (2006.01)
*G08G 1/04* (2006.01)
*G01S 7/00* (2006.01)
*G01S 13/00* (2006.01)

(56) References Cited

U.S. PATENT DOCUMENTS

| | | | | |
|---|---|---|---|---|
| 5,392,034 | A * | 2/1995 | Kuwagaki | G08G 1/015 340/933 |
| 5,402,346 | A * | 3/1995 | Lion | G08G 1/015 340/933 |
| 5,446,291 | A * | 8/1995 | Becker | G08G 1/015 250/559.24 |
| 5,508,697 | A * | 4/1996 | Kato | B26D 5/32 340/933 |
| 5,821,879 | A * | 10/1998 | Liepmann | G08G 1/04 340/933 |
| 8,115,670 | B2 * | 2/2012 | Klein | G08G 1/04 340/936 |
| 8,493,238 | B2 * | 7/2013 | Nagy | G08G 1/04 340/555 |
| 8,884,812 | B2 * | 11/2014 | Nagy | G01S 7/415 342/175 |
| 2010/0286898 | A1 | 11/2010 | Lin | |

OTHER PUBLICATIONS

Patent Examination Report received for Australian Patent Application No. 2012203252, Issued on Oct. 17, 2013, 3 pages.
Patent Examination Report received for Australian Patent Application No. 2012203248, Issued on Oct. 15, 2013, 2 pages.
International Written Opinion received for PCT Patent Application No. PCT/EP2012/061645, dated Dec. 27, 2012, 5 pages of official copy.
European Search Report Received for EP Patent Application No. 11450080.4, mailed on Oct. 17, 2011, 6 pages of official copy.
European Search Report Received for EP Patent Application No. 11450079.6, mailed on Oct. 17, 2011, 5 pages of official copy.
European Search Report Received for EP Patent Application No. 10450120.0 mailed on Jan. 20, 2011, 9 pages of official copy.
International Preliminary Examination Report received for PCT Patent Application No. PCT/EP2012/061645, mailed on May 23, 2013, 6 pages.
International Preliminary Report on Patentability received for PCT Patent Application No. PCT/EP2012/061645, mailed on Dec. 27, 2013, 8 pages.

* cited by examiner

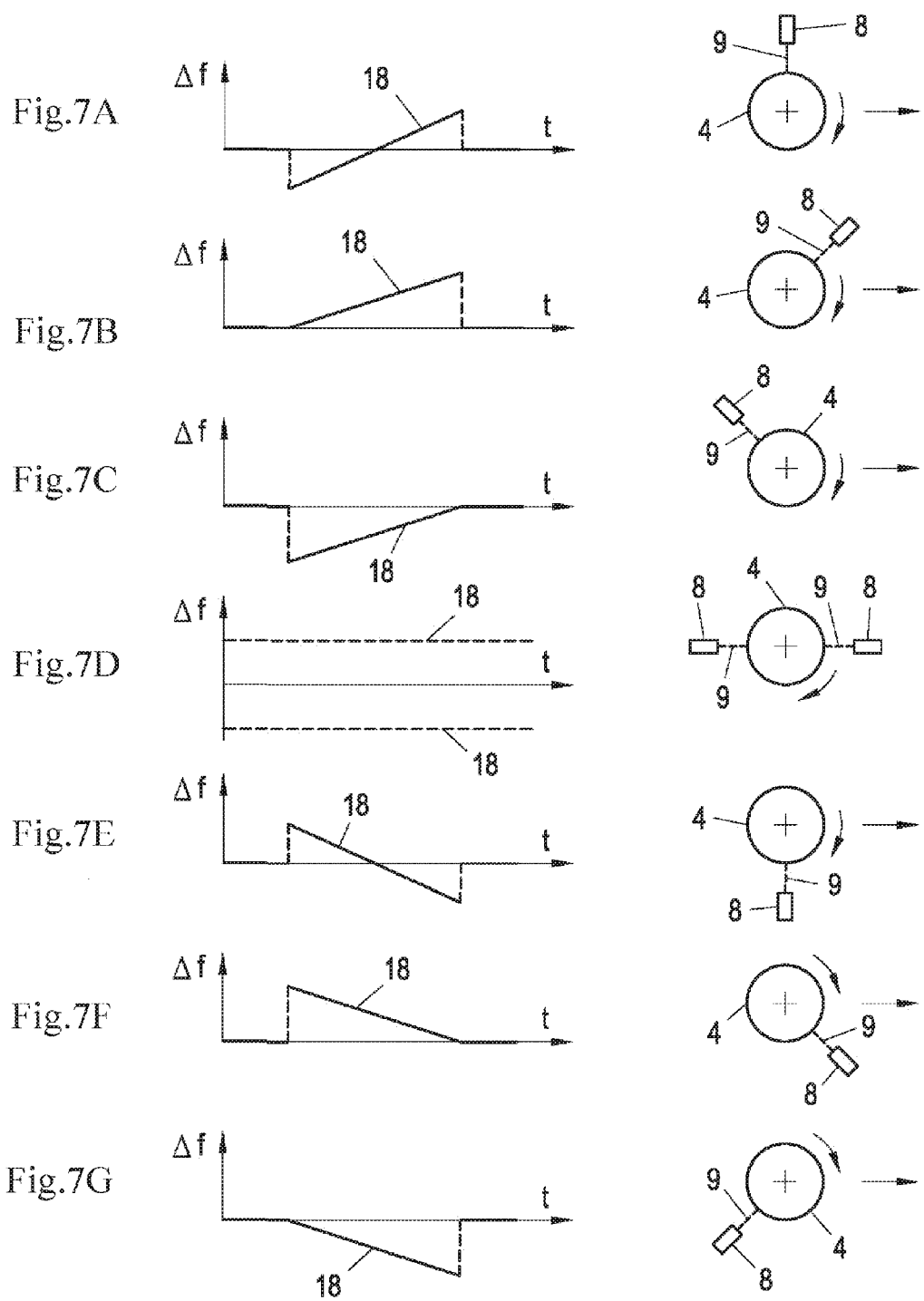

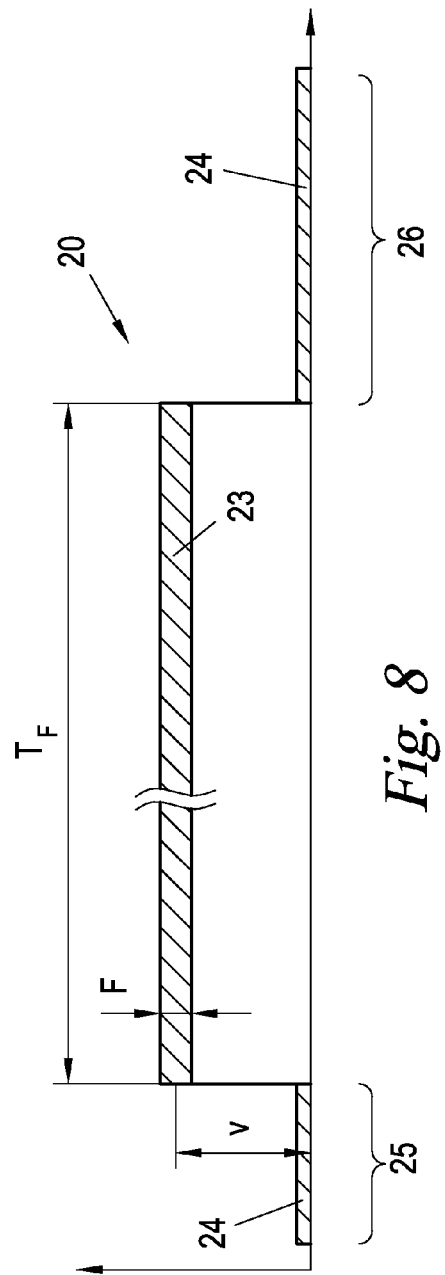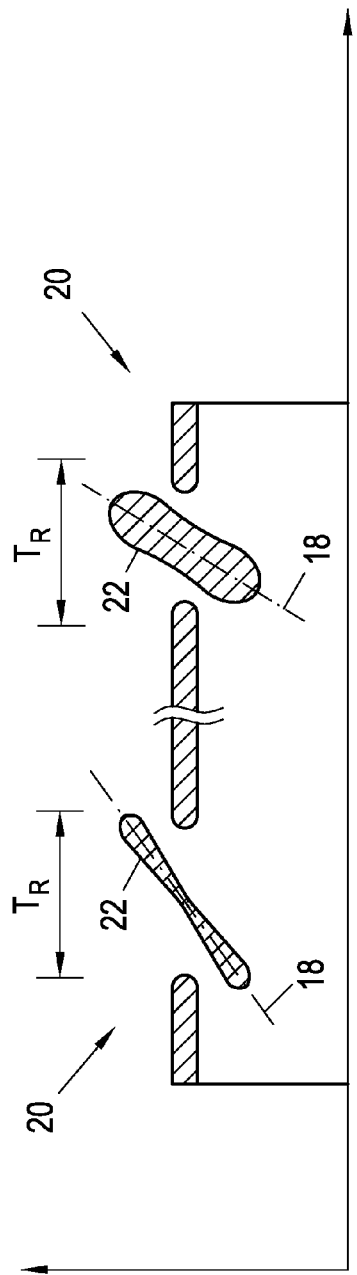

METHOD AND DEVICE FOR DETECTING A ROTATING WHEEL

CROSS-REFERENCE TO RELATED APPLICATION(S)

This application is a U.S. national phase of International Application No. PCT/EP2012/061645 filed Jun. 19, 2012, which designated the U.S. and claims priority to European Patent Application No. 11 450 079.6 and European Patent Application No. 11 450 080.4, the disclosures of which are herein incorporated by reference in their entireties.

BACKGROUND

Technical Field

The present application relates to a method and an apparatus for detecting a rotating wheel of a vehicle that is travelling on a roadway in a travel direction, the wheels of which are at least partially exposed laterally.

Detecting vehicle wheels is of interest for numerous applications. Thus it is possible to infer with certainty from the recognition of wheels that a given traffic area is being driven on in order to, for example, monitor borders or to initiate certain actions such as triggering an alarm, switching on lighting, opening a barrier, taking a picture for monitoring purposes, etc. Modern traffic fee systems also frequently base the calculation of fees on the number of axles of a vehicles, such that the detection of wheels (wheel axles) can also be an important basis for charging or controlling road tolls, especially by means of mobile control vehicles, which are to control the number of axles of vehicles subject to road tolls while overtaking or in oncoming traffic.

From DE 10 2008 037 233 A1 it is known to detect the wheels of a moving vehicle based on the horizontal component of the tangential velocity, which differs from the remainder of the vehicle and brings about a corresponding Doppler frequency shift of a radar measuring beam. For this purpose, a radar speed measuring unit is used which irradiates the lower area of passing vehicles with a radar beam lobe and, from the returning frequency mixture, determines a single speed measurement signal that has signal maxima at the locations of the wheels. Gaps between a traction vehicle and its trailer can falsely indicate signal minima and intermediate "false" maxima, which lead to an erroneous wheel detection.

BRIEF SUMMARY

An aim of the present application is to create a method and an apparatus for detecting wheels which enable a safer detection than the known solutions.

This aim is achieved in a first aspect with a method, which is characterised by the steps of emitting an electromagnetic measurement beam having a known temporal progression of its frequency onto a first section above the roadway in a direction in a slant with respect to the vertical and normal or at a slant with respect to the travel direction;

receiving a reflected measurement beam and recording the temporal progression of its frequencies relative to the known progression as a reception frequency mixture progression; and detecting a band of frequencies which is continuously inclining or declining within a period of time in the reception frequency mixture progression as a wheel.

An embodiment is based on a novel approach of detecting a wheel passing substantially horizontally past a Doppler-sensor by an inclining (e.g. if the Doppler-sensor lies above the axle of the wheel, is pointed downwards and is moving towards the wheel) or declining (e.g. if the Doppler-sensor lies below the axle of the wheel, is pointed upwards and is moving towards the wheel) reception frequency mixture progression during the passage. Unlike the known state of the art (DE 10 2008 037 233 A1), not just a signal maximum per wheel is evaluated, but the signal progression during the passage of the wheel.

In the ideal case of a line-like measuring beam which strikes the wheel from above or at a slant from the side and normal to the travel direction, the progression of the frequency shift of the reflected measuring beam caused by the Doppler effect is line-like inclining or declining. If the measuring beam is not normal to, but at a slant with respect to the driving direction, a horizontal component of the tangential velocity of the wheel caused by the Doppler shift is added to this progression, which leads to an additional offset of the progression; however, this does not change the criterion of the detection of an inclining or declining reception frequency progression during the passage of the wheel.

Furthermore, in reality the cross section of a measuring beam is never ideally point-like but always expanded, e.g. to an area of incidence on the vehicle is the range of a few centimeters or some tens of centimeters. Thereby the reception frequencies are broadened or spread from the described line-like progression to a "mixture" or rather "band" of reception frequencies: On varying height or width positions in the area of incidence of the measuring beam the rotating wheel has varying vertical and horizontal components of the tangential velocity and thereby creates different Doppler frequency shifts which lead to a "splitting" or "spreading", respectively, of the sending frequency of the measuring beam to a plurality of simultaneously reflected reception frequencies, a "reception frequency mixture"; viewed over time, the reception frequency mixture progresses as a band in the frequency/time plane with the described inclining or declining progression.

This spreading effect caused by the velocity of the wheel is superposed by a second parasitic frequency spreading effect which can be attributed to the different projection angles of the vertical and horizontal components of the tangential velocity onto the direction to the receiver: This projection angle varies according to the respective place of reflection in the area of incidence. The second spreading effect is independent of whether the vehicle body or the rotating wheel is passing the receiver at that moment and is solely determined by the geometrical constraints of the measurement setup. Both effects superpose to the mentioned band-like reception frequency mixture progression over time.

In a first embodiment said detecting can be carried out by evaluating the progression of the frequency average of the band, which frequency average shows the described incline or decline during the passage of the wheel.

In a second embodiment said detecting can be carried out by checking if the band falls into a given contour in the frequency/time plane. The contour constitutes the maximal boundaries in which the reception frequency progression for different sampling progressions can occur, and if all of the measurement data of the Doppler reception frequencies over time fall into said contour, there is a continuously inclining or declining band of frequencies in the reception frequency mixture progression, which indicates a wheel.

According to an embodiment, the measurement beam is emitted normally with respect to the travel direction at a slant downwards. Thereby a shadowing of the wheels can be minimised and the gap between a trailer and a traction vehicle can safely be detected on the one hand, and—with exception of the spreading effects mentioned above—the horizontal components of the velocity of the rotating wheel as well as the velocity component of the vehicle are ignored on the other hand, which eases the detection of said inclining and declining bands in the reception frequency mixture progression.

For further improvement of the band detection, in an optional embodiment the method can comprise following steps:

measuring the velocity of the body of the vehicle relative to the location of emission of the measurement beam and reception of the reflected measurement beam; and compensating the reception frequency mixture progression by those frequency parts which are caused by the velocity of the vehicle body, before said detecting of the band is conducted.

For the same reasons the method can also comprise the following steps:

detecting the presence of a part of the body of the vehicle in a second section which lies above the first section, in the temporal progression as a passage time window;

wherein detecting the wheel in the reception frequency mixture progression is only conducted during said passage time window.

In knowledge of the passage time window of the vehicle the reception frequency mixture progression can be further processed to ease the detection of the band therein, namely by the steps determining an interfering signal fraction in a section of the reception frequency mixture progression immediately preceding the passage time window; and compensating the reception frequency mixture progression in the passage time window by the interfering signal fraction, before said step of detecting the band is conducted.

In another further embodiment of the method wheels, which are detected during the same passage time window, are assigned to the very same vehicle. The number of wheels of a vehicle can be used as a basis for e.g. a road-toll charging dependent on the number of axles.

To further keep said parasitic spreading effects low and to obtain a distinct inclining or declining progression of the reception frequency mixture, the area of incidence of the measuring beam on the vehicle may be minimised. The measuring beam has an area of incidence whose diameter is less than a wheel which is to be detected, such as less than 10 cm, and especially less than 5 cm.

In a variation, a concentrated laser beam can be used for this purpose, or, in an alternative variant, the measuring beam is a radar beam emitted by a directional antenna, such as in a frequency range above 70 GHz. With such high frequencies the wavelength is very small and the antennas can thereby be mechanically realised very small with a high antenna gain, e.g. in form of horn antennas or antenna arrays.

In a second aspect an apparatus is created for detecting a rotating wheel of a vehicle that is travelling on a roadway in a travel direction, the wheels of which are at least partially exposed laterally, the apparatus being characterised by a Doppler-lidar device or a Doppler-radar device which emits an electromagnetic measurement beam having a known temporal progression of its frequency onto a target above the roadway in a direction in a slant with respect to the vertical and normal or in a slant with respect to the travel direction; and which records the temporal progression of the frequencies of the measurement beam reflected by the target, relative to the known progression, as a reception frequency mixture progression; and a subsequent evaluation device configured to detect a band of frequencies which is continuously inclining or declining over a period of time in the reception frequency mixture progression, as a wheel.

With regard to the advantages of the apparatus it is referred to the teachings stated above for the method.

The measuring beam of the Doppler-lidar device or the Doppler-radar device may be oriented normally with respect to the travel direction and at a slant downwards.

It is especially favourable if the apparatus has a sensor connected to the evaluation device for measuring the velocity of the body of the vehicle, wherein the evaluation device compensates the reception frequency mixture progression by those frequency parts which are caused by the velocity of the vehicle body.

According to another feature the apparatus comprises a sensor connected to the evaluation device which detects the presence of a part of the body of the vehicle above that section onto which the measurement beam is directed in the temporal progression as a passage time window, wherein the evaluation device detects a wheel in the reception frequency mixture progression only during said passage time window. In this case, the evaluation device can optionally be configured to determine an interfering signal fraction in a section of the reception frequency mixture progression immediately preceding said passage time window and to compensate the reception frequency mixture progression in the passage time window by said interfering signal fraction.

In case of a Doppler-radar device, its measuring beam may be a radar beam emitted by a directional antenna, especially in a frequency range above 70 GHz; in case of a Doppler-lidar device the measuring beam may be a concentrated laser beam.

The apparatus is suited for both a stationary as well as a transportable, especially a mobile use. In the first case the apparatus can—if it works with a Doppler-radar device—be designed especially as to be assembled with the radio beacons of an already existing radio-road infrastructure, like WLAN (wireless local area network), WAVE (wireless access in a vehicle environment) or DSRC (dedicated short range communication). In a practicable embodiment the Doppler-radar device is designed as a roadside WLAN, WAVE or DSRC radio beacon. In the second case the Doppler-lidar device or the Doppler-radar device is mounted on a mobile platform, such as a control vehicle, to permit the control of vehicles on different road lane or in the oncoming traffic.

BRIEF DESCRIPTION OF THE DRAWINGS/FIGURES

Further features and advantages of the method and of the apparatus will become apparent from the subsequent description of an embodiment with regard to the enclosed drawings, in which:

FIGS. 7a to 7g show exemplary idealised reception frequency progression and the frequency averages, respectively, of reception frequency mixture progressions at different angular positions of the Doppler measurement beam with respect to the wheel;

FIG. 8 shows the effect of the frequency spreading caused by geometry during the passage of a vehicle in the temporal progression; and FIG. 9 shows the implications of the effects of the frequency spreading of the reception frequency mixture progression caused by velocity and geometry during the passage of a vehicle with two exemplary wheels, wherein in the left and in the right half of FIG. 9 two different cross sections of the measuring beam are used.

Figure 1:
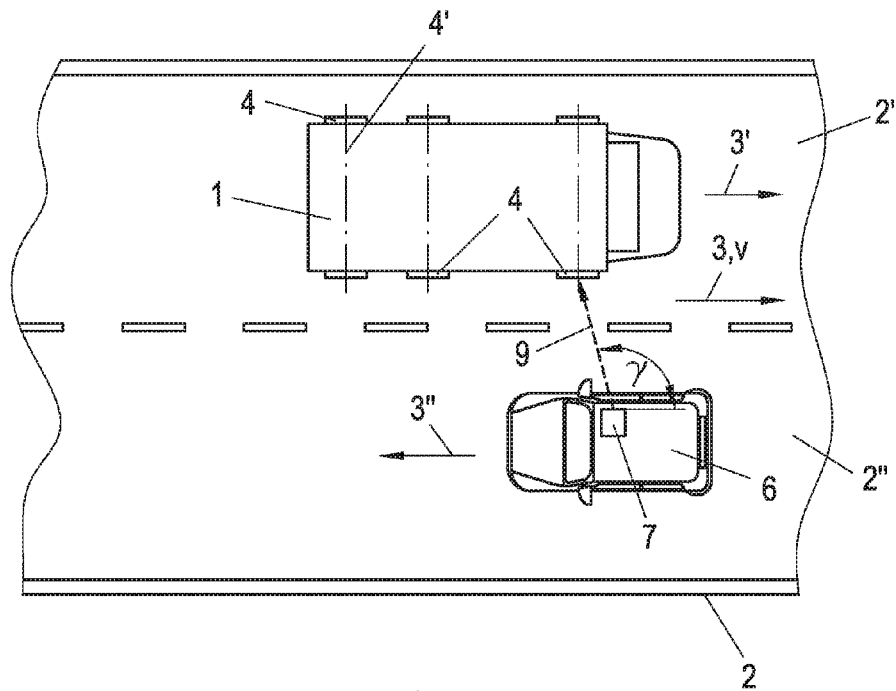
FIGS. 1 and 2 show the apparatus mounted on a control vehicle in combination with a vehicle controlled by it in a top view (FIG. 1) and viewed in the travel direction (FIG. 2)
Figure 2:
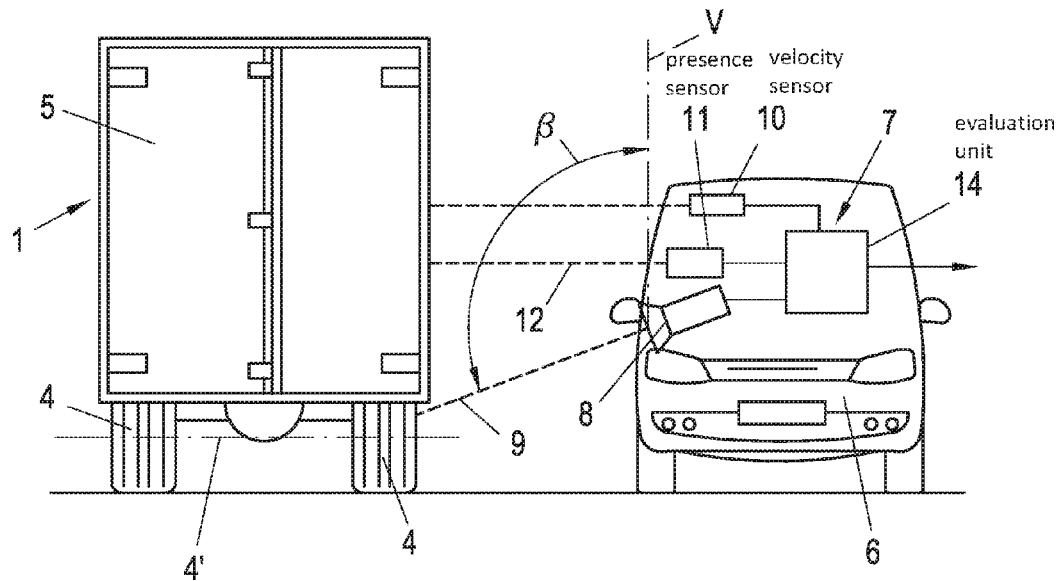

In FIGS. 1 and 2 a vehicle 1 is moving on a roadway 2, more precisely on a lane 2' of the roadway 2, in a travel direction 3'. The vehicle 1 has wheels 4 which protrude downwards above the body 5 of the vehicle 2 and are thereby exposed—at least partially—on the sides of the vehicle body 5 in recesses thereof, i.e. they can be seen from the side.

DETAILED DESCRIPTION

On a second lane 2'' of the roadway 2 a control vehicle 6 is moving in an opposite travel direction 3''. The travel directions 3', 3'' may be anti-parallel, but could also be parallel, i.e. the control vehicle 6 could overtake the vehicle 1 or vice versa. The control vehicle 6 could also be stationary and the travel directions 3', 3'' could be non-parallel; in the following the relative movement direction of the vehicle 1 with respect to the control vehicle 6 is denoted as the travel direction 3 of the vehicle 1. For simplicity it is also assumed that the travel direction 3 is approximately normal to the axles 4' of the wheels 4 and is approximately horizontal, although this is not compulsory and deviations thereof are merely reflected in correspondingly changed projection angles of the velocity components considered in the following.

The control vehicle 6 carries a measuring apparatus 7 with a Doppler-lidar or Doppler-radar device 8 which emits an electromagnetic measuring beam 9, in this case a lidar or radar measuring beam, onto the vehicle 1 or its wheels 4, respectively, during the passage to detect the wheels 4 of the vehicle 1. The measuring beam 9 is oriented in an angle β to the vertical V and in an angle γ to the travel direction 3. The angle β is 0≤β<90° or 90°<β≤180°, in any case ≠90°, i.e. the measuring beam 9 runs at a slant to the vertical V, such as at a slant downwards as shown, e.g. in an angle of β=100° to 170°, including β=120° to 150°. In an alternative (not shown) embodiment the measuring beam 9 could also be directed at a slant upwards, e.g. β=10° to 80°, including β=30° to 60°, if the Doppler lidar/radar device 8 is mounted close to the ground, e.g. stationary on the side of the road 2, and aims at the vehicle 1 and its wheels 4 at a slant from below.

The angle γ may be 90°, i.e. the measuring beam 8 is oriented normally to the travel direction 3. In alternative variants the angle γ can also be ≠90°, e.g. at a slant forwards or backwards, as viewed from the control vehicle 6.

In a manner known in the art, the Doppler lidar/radar device 8 evaluates the reception frequency of the measurement beam 9 reflected by the vehicle 1 or its wheels 4, wherein the (projected) component $v_p$ of the relative vehicle velocity v of the vehicle 1, or the tangential velocity $v_t$ of the wheel 4 at the respective point P of the incidence area of the measurement beam 9 (see FIGS. 3 and 5), respectively, lying in the direction of the measurement beam 9, can be determined e.g. from the Doppler effect induced frequency shift between emitted and reflected measurement beams 9. The wheels 4 of the vehicle 1 can then be detected from this information, as will be described in greater detail below.

The Doppler lidar/radar device 8 itself can be of any type known in the art, whether with a continuous, modulated, or pulsed measurement beam 9. For a continuous measurement beam 9 a Doppler frequency shift between the natural frequencies ("carrier frequencies") of the emitted and reflected measurement beam 9 can be determined by interference measurement. For a pulsed or modulated measurement beam, a Doppler shift between the pulse rates or modulation frequencies of the emitted and the reflected measurement beams 9 can be measured. The terms "sending frequency" of the measuring beam 9 and "reception frequency" of the reflected measurement beam 9 used herein are understood to mean all such natural, carrier, pulse, or modulation frequencies of the measurement beam 7, i.e., the term reception frequency comprises any type of frequency of the measurement beam 9 which can be influenced by the Doppler effect.

As shown in FIG. 2, the measuring apparatus 7 further comprises a velocity sensor 10 to measure the (relative) movement v of the vehicle 1 with respect to the control vehicle 6, as well as a presence sensor 11 to detect the presence of a part of the vehicle body 5 during the passage of the vehicle 1 at the control vehicle 6. The presence sensor 11 "sees" and detects the vehicle body 5 in a section in which the measuring beam 9 is directed onto the vehicle 1 during the vehicle passage, whereby a passage time window $T_F$ of the vehicle 1 can be determined with respect to the lidar/radar device 8, as will be described in greater detail below. The presence sensor 11 and its line of sight 12 may be arranged above the measuring beam 9 of the lidar/radar device 8—or in a known geometrical relation thereto—to obtain a temporal relation between the passage time window $T_F$ and the measurement signals of the lidar/radar device 8. From the passage time window $T_F$ and in knowledge of the velocity v measured by the sensor 10 the length L of the vehicle 1 can also be calculated according to L=v·T.

The lidar/radar device 8 and the velocity and presence sensors 10, 11 are connected to an evaluation unit 14 of the device 7, which performs the evaluation calculations illustrated hereinafter.

Figure 3:
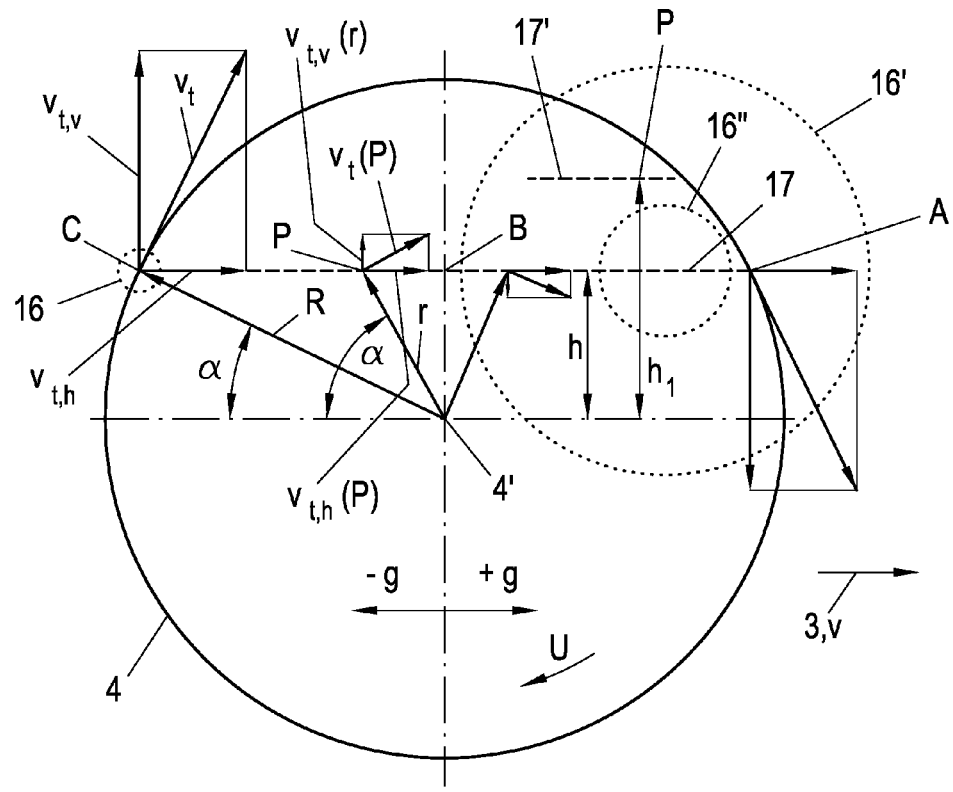
FIG. 3 shows the velocity relations in a rotating wheel in detail.

FIG. 3 shows different embodiments of the measuring beam 9 with respect to its concentration or expansion, respectively, by means of several exemplary areas of incidence 16, 16', 16'' with varying size on a wheel 4. In a first variant the measurement beam 9 is strongly concentrated, so that its area of incidence 16 on the vehicle body 5 or the wheel 4 has a small diameter in the range of several centimeters, such as <2 cm. Defined requirements are placed on the concentration of the measurement beam 9, depending on the distance of the device 8 from the vehicle 1: In the ideal case, the measurement beam 9 is a bundle of nearly parallel light or radar rays that can be obtained with a laser. But even with a radar measurement beam, a corresponding concentration can be achieved by using radar waves with a very high frequency, such as above 70 GHz, which have nearly the properties of light and can be concentrated e.g. by radar lenses. The use of directional antennas, e.g. horn antennas, antenna arrays and patch antennas, with the most parallel, small-diameter radiation characteristic possible, also generates an appropriate radar measurement beam. Especially suited are radar devices from the automotive field, such as those used in vehicles as collision and distance warning devices. Such concentrated measurement beams 9 have a concentration or a diversion or expansion range (aperture angle) of less than 1° (which corresponds to a solid angle of less than approximately 0.00024 sr).

In a second embodiment the measuring beam 9 is expanded wider, e.g. scattered or expanded in a plane or cone, in the manner of a "measuring beam lobe" with a substantially larger area of incidence 16'. Such an area of incidence 16' can be achieved in a lidar device e.g. by a disperging lens placed in front thereof, or appears with radar devices whose concentration is not exact.

In the case of radar, a widened measurement beam 9 is characterised by the aperture angle of the radar antenna being used. The aperture angle (or the half-value width) of a directional antenna refers to the points where the power has declined to half (−3 dB) relative to the maximum. As known to those skilled in the art, the gain of the antenna in its main radiation direction can be estimated with the following formula from knowledge of the respective aperture angle:

$$g = 10 lg \frac{27.000}{\Delta\varphi\Delta\vartheta}$$

where
g=gain [dBi]
Δφ=horizontal aperture angle (in degrees)
Δθ=vertical aperture angle (in degrees)

The aperture angle of the radar antenna of the device 8 should allow for a good separation of the individual wheels 4 in the measurement signal of the vehicle 1 to be detected. Thus, it is e.g. favorable if the incidence area 16' of the measurement beam lobe 15 does not exceed half the diameter of the wheel 4 of the vehicle 1. The optimal area of incidence 16' results from the measuring distance from the vehicle 1 and therefore the selection of the radar antenna depends on the geometry of the overall arrangement. In general, antennas with a gain g of more than 10 dB are especially suitable, depending on the arrangement and frequency of the radar device 8.

Directional antennas usually have an antenna gain g of more than 20 dB (which corresponds to an aperture angle Δφ=Δθ=approx. 16°). Thus, an area 16' that is 28 cm in diameter can be illuminated 1 meter away from the vehicle 1 with an antenna gain of 20 dB. An antenna gain g of 30 dB can be necessary for more distant vehicles 1 in order to achieve an aperture angle Δφ=Δθ=approx. 5°, which implies an illumination area 16' of approx. 30 cm in size at a distance of 3 m.

In a third variant the size of the area of incidence 16" of the measuring beam 9 on a wheel 4 is between the size of the variants 16 and 16', e.g. in a range of 2-10 cm, such as 2-5 cm.

FIG. 3 shows the movement of the area of incidence 16, 16', 16" during the mutual passage of the vehicle 1 and the control vehicle 6 along a sampling line 17 which crosses the wheel 4 about in the middle of its upper half in this example. The tangential velocity $v_t$ or $v_t(P)$ occurring on a point P of the sampling line 17 on a radius r of the wheel 4 rotating in the rotation direction U can be divided into a horizontal component $v_{t,h}(P)$ and a vertical component $v_{t,v}(P)$. The horizontal component $v_{t,h}(P)$ stays substantially constant on a given horizontal sampling line 17, whereas the vertical component $v_{t,v}(P)$ changes from a negative maximum value $v_{t,v}(A)$ on a point A on the circumference of the wheel to the value 0 at a point B on the axis 4' of the wheel up to a positive maximum value $v_{t,v}(C)$ at a point C on the other circumference of the wheel.

In detail, the tangential velocity $v_t(r)$ on a radius r is proportional to this radius r, namely $$v_t(t) = \frac{r}{R} v_t \quad (1)$$

The vertical component $v_{t,v}(r)$ of the tangential velocity $v_t(r)$ at an angle α is a cosine projection corresponding to $$v_{t,v}(r) = \frac{r}{R} v_t \cos\alpha \quad (2)$$

With $$\cos\alpha = \frac{g}{r} \quad (3)$$

the horizontal component $v_{t,v}(r)$ of the tangential velocity results to $$v_{t,v}(r) = v_t \frac{g}{R} \quad (4)$$

where g is the horizontal distance to the center of the wheel and thereby—when sampling with a constant velocity v—proportional to the time t, which describes a linear incline or decline.

Figure 4:
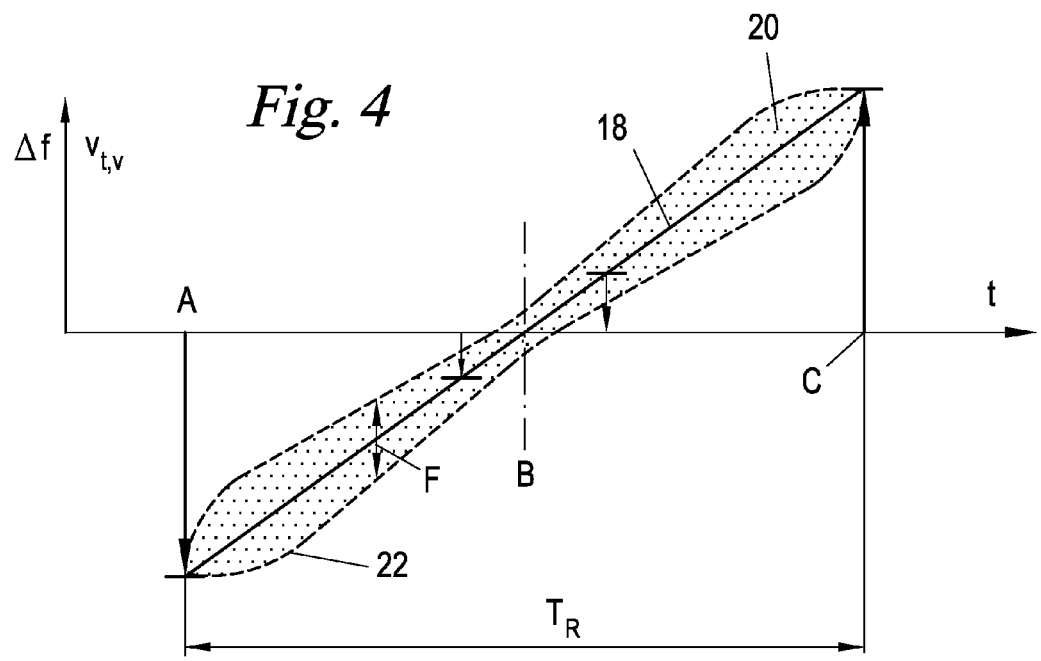
FIG. 4 shows an exemplary reception frequency mixture progression in the frequency/time plane during measurement of the wheel of FIG. 3 laterally from above and normally to the direction of travel in oncoming traffic.

If the measuring beam 9 is directed normally to the travel direction (γ=90°) and e.g. at a slant from above (90°<<β<180°), the lidar/radar device 8 measures a frequency shift Δf due to the Doppler effect, which corresponds exactly to this vertical component $v_{t,v}(P)$. The frequency shift Δf is depicted in FIG. 4 over the time t as a reception frequency progression 18. The Doppler shift Δf of the reception frequency with respect to the sending frequency is proportional to the vertical velocity component $v_{t,v}$ of the corresponding sampled parts (points P) of the vehicle 1 or wheel 4, respectively; the reception frequency progression 18 depicted in FIG. 4 is therefore equivalent to a vertical velocity progression.

The reception frequency progression 18 of FIG. 4 is an idealised progression for an idealised measuring beam 9 with a point-like cross section of the beam. The progression 18 shows a linear incline from $v_{t,v}(A)$ to $v_{t,v}(B)$ crossing the point of origin during a time segment $T_R$ which corresponds to the sampling of the wheel along the sampling line 17 with the velocity v. Would the measuring beam 9 be directed at a slant from below onto the wheel 4 ($\beta>90°$) or be moved in the opposite direction along the sampling line 17 (e.g. control vehicle 6 overtakes vehicle 1), then the reception frequency progression 18 shows a decline, i.e. it is mirrored about the time axis t of FIG. 4.

Because of the expansion of the area of incidence 16, 16' or 16", respectively, of a real, non-idealised measuring beam 9, for each sending frequency emitted at a specific point in time t not only one reception frequency, which is shifted by the Doppler effect, is received, but a slightly differing reception frequency from each different point in the area of incidence 16, 16', 16". On one hand this is due to the fact that on a height $h_1$ differing from the height h of the sampling progression 17 the vertical component $v_{t,v}$ (and also the horizontal component $v_{t,h}$) of the tangential velocity $v_t$ each has a slightly differing value, such that the reception frequencies originating from different points of incidence P in the areas 16, 16', 16"—compare the exemplary sampling progression 17' in FIG. 3—superpose to a mixture of differing reception frequencies or velocities, respectively, see FIG. 4.

In other words, the reception frequency f splits or spreads to a mixture F of reception frequencies (or velocities) caused by the Doppler effect, respectively, during the passage $T_F$ of a vehicle 1 when a wheel 4 occurs, which leads to a reception frequency mixture 20 over time t.

The frequency spread effect caused by the velocity of the wheel is superposed parasitically by a second frequency spreading effect which is caused by the geometry of a measuring beam 9 flared in a cone shape. As can be seen from FIG. 6, the radar/lidar device 8 observes, from a position $P_1$, different points $P_2'$, $P_2''$ in the area of incidence 16' of the measuring beam 9 each under a different spatial direction 21', 21", which each enclose a different solid angle with the vertical and horizontal components $v_{t,v}$ and $v_{t,h}$ of the tangential velocity $v_t$ of the wheel 4 or the velocity v of the vehicle body 5, respectively. The projection of the velocity $v_{t,v}$ or $v_{t,h}$, respectively, onto the measuring beam direction 21', 21" et cet. in the measuring beam 9 thereby leads to a splittering or spreading, respectively, caused by the geometry in the areas 16, 16', 16".

The spread caused by the velocities of the rotating wheel (FIG. 3) superposes with the spread caused by the geometry (FIG. 6) to the "real" reception frequency mixture progression 20 with the frequency spread F varying over time t.

As can be seen from FIG. 4, the reception frequency mixture progression 20 therefore shows for a measuring beam 9, which is directed at a slant from above or at a slant from below ($0<\beta<180°$) and approximately normally to the travel direction 3 ($\gamma=90°$), a continuously inclining or—depending on the viewing direction—declining band 22 during the passage time $T_F$ of the wheel 4, which can be used as a criterion for the occurrence of a wheel and therefore for the detection of the wheel 4. For example, the band 22 can be detected by signal analytical means by averaging the occurring reception frequency mixture F, i.e. by analysis of the frequency average (which again substantially corresponds to the idealised progression 18).

Figure 5:
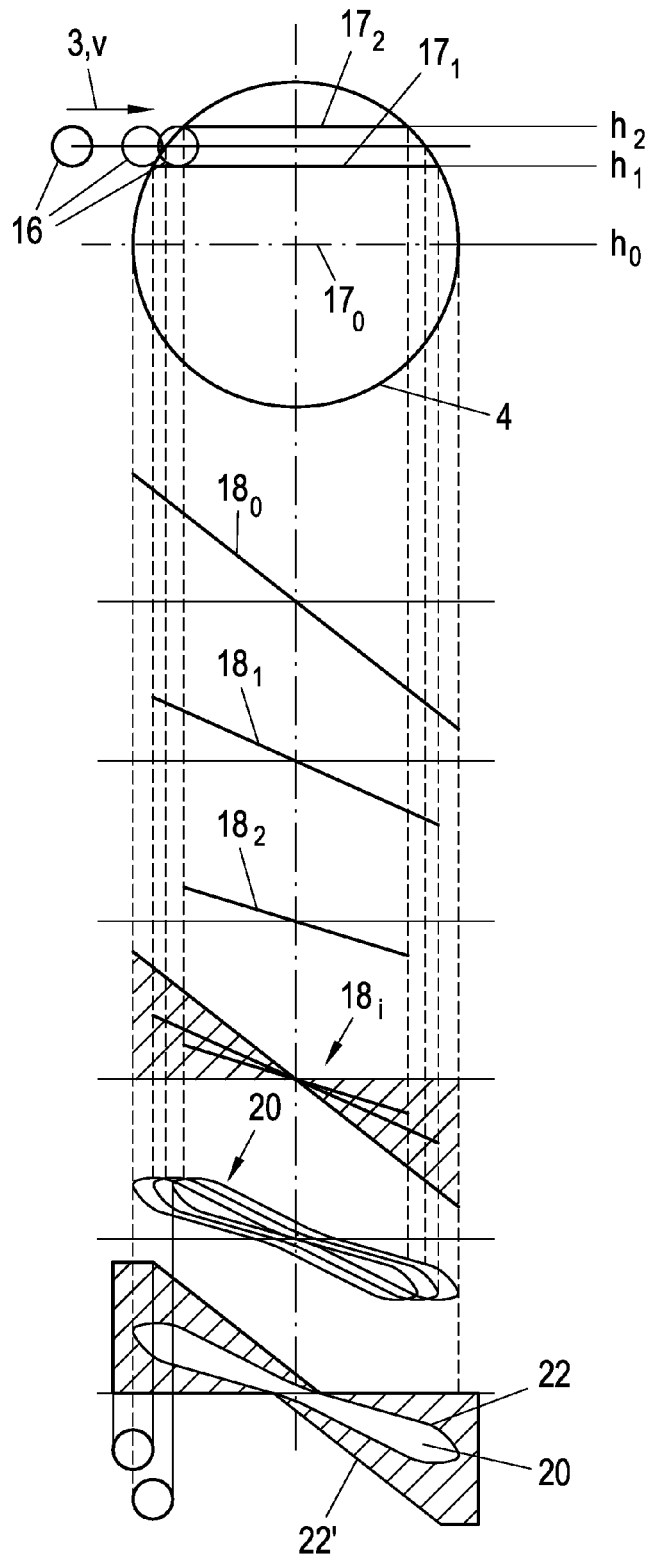
FIG. 5 shows the derivation of a detection contour for detecting an inclining and declining band in the reception frequency mixture progression in the frequency/time plane.

FIG. 5 shows an alternative way of the detection of the occurrence of an inclining or declining band 22, namely by checking if the reception frequency mixture progression 22 falls into a given contour 22', which constitutes the maximum frequency boundaries in which reception frequency progressions $18_0$, $18_1$, $18_2$, . . . , generally $18_i$, for different sampling progressions $17_0$, $17_1$, $17_2$, . . . , on different heights $h_0$, $h_1$, $h_2$, . . . , can occur. The superposition of all possible reception frequency progressions $18_i$ for a certain area of incidence 16 provides the given contour 22' in the frequency/time plane of FIG. 4 or 5, respectively, into which a band 22 falls in any case.

Although the size and form of the contour 22' indeed depends on the size of the area of incidence 16, the global progression of the contour 22' over time t is always inclining or declining. By checking if all (or at least the predominant part, i.e. except for a few statistical "outliers") reception frequency measurements of the reception frequency mixture progression 20 lie within the contour 22', the occurrence of a band 22 continually inclining or declining over a period of time can again be detected.

If the measuring beam 9 is not directed normally to the travel direction 3 but at a slant ($\gamma \neq 90°$) thereto onto the vehicle 1 or the wheels 4, respectively, due to the projection of the horizontal components $v_{t,h}$ of the tangential velocity $v_t$ of the wheel 4 onto the direction of the measuring beam an additional horizontal velocity component is measured which is constant for a certain height h, $h_1$ of the sampling line 17 and weighs in as an offset on the idealised reception frequency progression 18 or real reception frequency mixture progression 20 of FIG. 4. In FIG. 7 this is shown for the idealised reception frequency progression 18 of FIG. 4, and the following Table 1 depicts the values of $\beta$ and $\gamma$ for the examples of FIGS. 7a to 7g:

TABLE 1

| FIG. 7 | $\beta$ | $\gamma$ |
|---|---|---|
| a) | 135° | 90° |
| b) | 135° | 135° |
| c) | 135° | 45° |
| d) | 90° | 45°/135° |
| e) | 45° | 90° |
| f) | 45° | 135° |
| g) | 45° | 45° |

In knowledge of the velocity v, which e.g. is measured by the velocity sensor 10 or by the device 8 itself, the reception frequency progressions 18 or reception frequency mixture progressions 20 can be corrected or compensated, respectively, by the respective parts $v_{t,h}$ caused by the velocity, which correspond to an offset compensation of FIGS. 7a) to 7g) and again leads back to the exemplary reception frequency mixture progression shown in FIG. 4 or to a progression mirrored about the time axis t.

FIG. 8 shows the measurement of a passage time slot $T_F$ for the passage of a whole vehicle 1 with respect to the device 8 or measurement beam 9, respectively, such as by means of a separate presence sensor 11. For example, the presence sensor 11 can again be a radar or lidar device, which emits a radar or lidar measurement beam 12 onto the passing vehicle 1 to measure the duration $T_F$ of the vehicle passage and to reference the recorded reception frequency mixture progression 20 thereto.

Figure 6:
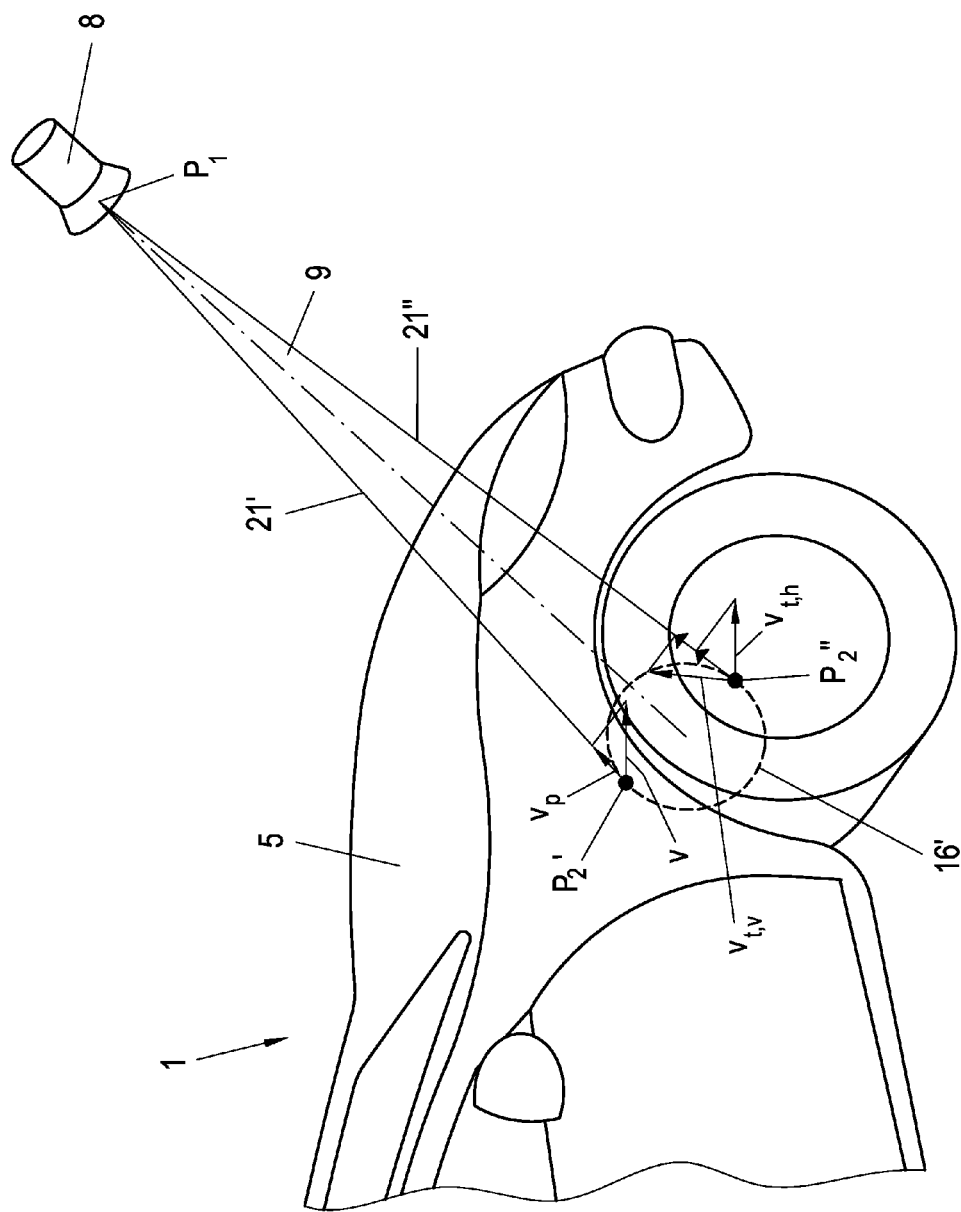
FIG. 6 shows the geometrical relations in a real expanded measurement beam for exemplification of the frequency spreading effects caused by velocity and by geometry.

In FIG. 8 the measurement beam 9 was exclusively directed onto the vehicle body 5 for means of comparison, namely under an angle of $\gamma \neq 90°$, i.e. at a slant to the travel direction 3, such that the relative velocity v of the vehicle 1 during the vehicle passage $T_F$ can be measured as a rectangular frequency shift, which is spread to a reception frequency mixture F in a band 23, which is caused exclusively by the spread caused by the geometry of an conically flared measuring beam 9 according to FIG. 6.

An interfering signal fraction in the reception signal of the lidar/radar device 8 which is occurring outside of the vehicle passage $T_F$ is denoted by 24. In knowledge of the passage time window $T_F$, a section 25 immediately preceding the passage time window $T_F$, or a section 26 immediately succeeding the passage window slot $T_F$ can be extracted from the reception frequency mixture progression 20 and the interfering signal fraction 24 can be determined therein; this interfering signal fraction 24 can be used to compensate the reception frequency mixture progression 20 for this interfering signal fraction 24. For example, a frequency analysis of the reception frequencies occurring in the sections 25, 26 could be performed and these could be deleted or subtracted, respectively, from the reception frequency mixtures F during the vehicle passage $T_F$.

To this end the section 25 preceding the vehicle passage $T_F$ may be used, because the vehicle 1 could, for example, have a trailer which could mistakenly be used as an interfering signal in the succeeding section 26.

Furthermore the determination of the passage time window $T_F$ can be used to assign all those wheels which are detected during the passage time window $T_F$ to this very same vehicle 1, which can be calculated accordingly from the evaluation unit 14 of the apparatus 7.

The passage time window $T_F$ of the vehicle passage could also be directly determined from the radar/lidar device 8 instead of the separate presence sensor 11, i.e. with the very same measuring beam 9. If the measuring beam 9 is directed under an angle of $\gamma \neq 90°$ (as in FIG. 8) onto the vehicle 1, the passage time slot $T_F$ could be determined e.g. on the basis of the frequency shifts on leaps 27, 28 of the band 23, and/or from the occurrence of the frequency spread caused by the geometry in the reception frequency mixture progression 20.

The determination of the relative velocity v of the vehicle 1 could also be conducted by e.g. the lidar/radar-device 8 itself, e.g. by means of the size of the frequency leaps 27, 28 of the band 23, instead of the separate velocity sensor 10.

FIG. 9 shows two exemplary reception frequency mixture progressions 20, after these have been corrected by the components due to the velocity v of the vehicle 1 on the one hand and by the interfering signal fractures 24 that were determined in the preceding section 25 on the other hand. In the left half of FIG. 9 the occurrence of a continuously inclining band 22 in the reception frequency mixture 20 is apparent, which indicates a wheel 4, in the case of a small area of incidence 16. In the right half of FIG. 9 the same situation is depicted when the area of incidence 16' of the measuring beam 9 on the wheel 4 is larger than half the wheel diameter, such that the measuring beam 9 simultaneously measures significant positive and negative vertical components $v_{t,v}$ of the wheel 4 at certain points in time. This leads to a closer "merging" of the beginning and ending spikes of the reception frequency mixture 20, i.e. to a steeper incline or decline 18.

The device 7 can both be realised in mobile form, e.g. mounted on the vehicle 6, and in stationary form, e.g. using existing wireless infrastructure of a roadway, e.g., using WAVE or DSRC radio beacons of a road toll system or WLAN radio beacons of a roadside Internet infrastructure. Thereby already existing transmitter components of the WLAN, WAVE, or DSRC radio beacons can be used as transmission components of the Doppler radar device 8; receiver sections of the radio beacons can likewise be used as the receiver components of the Doppler radar device 8, or can at least be integrated into the receiver components of the radio beacons. The apparatus and the method can be implemented in this manner as a software application running a conventional mobile or stationary WLAN, WAVE, or DSRC radio control device or beacon, for example.

It has been assumed that the transmission frequency of the radar/lidar device 8 or the measurement beam 9 is constant, i.e., its progression over time (temporal progression) is a constant progression. However, it is also possible that the device 8 could emit a measurement beam 9 with a temporally non-constant transmission frequency progression, e.g., as in frequency hopping methods in which the frequency changes constantly according to a predetermined or known pattern. The recorded reception frequency (mixture) progressions 18, 20 are recorded relative to the known temporal progression of the transmission frequency of the measurement beam 9—whether constant or varying, i.e., referenced or standardized thereto, so that the effect of known transmission frequency progressions can be compensated.

CONCLUSION

The invention is thus not restricted to the described embodiments, but also encompasses all variations and modifications which fall under the scope of the enclosed claims.

The invention claimed is:

1. A method for detecting a rotating wheel of a vehicle that is travelling on a roadway in a travel direction, the wheels of which are at least partially exposed laterally, the method comprising:
   emitting an electromagnetic measurement beam having a known temporal progression of its frequency onto a first section above the roadway in a direction in a slant with respect to the vertical and normal or at a slant with respect to the travel direction;
   receiving a reflected measurement beam and recording a temporal progression of its frequencies relative to the known temporal progression as a reception frequency mixture progression; and
   detecting a band of frequencies which is continuously inclining or declining over a period of time in the reception frequency mixture progression as a wheel.

2. The method of claim 1, wherein said detecting is carried out by evaluating the temporal progression of a frequency average of the band.

3. The method of claim 1, wherein said detecting is carried out by checking if the band falls into a given contour in the frequency/time plane.

4. The method of claim 1 wherein the measurement beam is emitted along a normal to the travel direction at a slant downwards.

5. The method of claim 1, further comprising:
   measuring a velocity of a body of the vehicle relative to a location of emission of the measurement beam and reception of the reflected measurement beam; and
   compensating the reception frequency mixture progression by those frequency parts which are caused by the velocity of the vehicle body, before said detecting of the band is conducted.

6. The method of claim 1, further comprising:
   detecting the presence of a part of a body of the vehicle in a second section which lies above the first section in the temporal progression as a passage time window;
   wherein detecting the wheel in the reception frequency mixture progression is only conducted during said passage time window.

7. The method of claim 6, further comprising:
   determining an interfering signal fraction in a section of the reception frequency mixture progression immediately preceding the passage time window; and compensating the reception frequency mixture progression in the passage time window by the interfering signal fraction, before said step of detecting the band is conducted.

8. The method of claim 6, wherein wheels, which are detected during the same passage time window, are assigned to the very same vehicle.

9. The method of claim 1 wherein the measurement beam has an area of incidence, whose diameter is less than a wheel which is to be detected.

10. The method of claim 1 wherein the measurement beam is a radar beam emitted by a directional antenna.

11. The method of claim 10, wherein the directional antenna emits the radar beam in a frequency range above 70 GHz.

12. The method of claim 9, wherein the diameter of the area of incidence of the measurement beam is less than 10 cm.

13. The method of claim 12, wherein the diameter of the area of incidence of the measurement beam is less than 5 cm.

14. An apparatus for detecting a rotating wheel of a vehicle, that is travelling on a roadway in a travel direction, the wheels of which are at least partially exposed laterally, the apparatus comprising:
a Doppler-lidar device or a Doppler-radar device which emits an electromagnetic measurement beam having a known temporal progression of its frequency onto a target above the roadway in a direction in a slant with respect to the vertical and normal or in a slant with respect to the travel direction and
which records the temporal progression of the frequencies of the measurement beam reflected by the target, relative to the known temporal progression, as a reception frequency mixture progression; and
a subsequent evaluation device configured to detect a band of frequencies which is continuously inclining or declining within a period of time, in the reception frequency mixture progression as a wheel.

15. The apparatus of claim 14, further comprising:
a sensor connected to the evaluation device for measuring a velocity of a body of the vehicle, wherein the evaluation device compensates the reception frequency mixture progression by those frequency parts which are caused by the velocity of the vehicle body.

16. The apparatus according to claim 14, further comprising:
a sensor connected to the evaluation device which detects the presence of a part of a body of the vehicle above that section onto which the measurement beam is directed in the temporal progression as a passage time window;
wherein the evaluation device detects a wheel in the reception frequency mixture progression only during said passage time window.

17. The apparatus of claim 16, wherein the evaluation device is further configured to determine an interfering signal fraction in a section of the reception frequency mixture progression immediately preceding said passage time window and to compensate the reception frequency mixture progression in the passage time window by said interfering signal fraction.

18. The apparatus of claim 14 wherein the Doppler-lidar device or Doppler-radar device is mounted on a mobile platform.

19. The apparatus of claim 18, wherein the mobile platform is a control vehicle.

20. The apparatus of claim 14, wherein the evaluation device is configured to detect the band of frequencies by at least one of evaluating the progression of the frequency average of the band or checking if the band falls into a given contour in the frequency/time plane.

* * * * *

UNITED STATES PATENT AND TRADEMARK OFFICE
CERTIFICATE OF CORRECTION

PATENT NO. : 9,507,014 B2
APPLICATION NO. : 14/127875
DATED : November 29, 2016
INVENTOR(S) : Andreas Stelzer et al.

It is certified that error appears in the above-identified patent and that said Letters Patent is hereby corrected as shown below:

In the Specification

In Column 7, Line 41, delete "$\Delta\phi$" and insert -- $\Delta\varphi$ --, therefor.

In Column 7, Line 42, delete "$\Delta\theta$" and insert -- $\Delta\vartheta$ --, therefor.

In Column 7, Line 57, delete "$\Delta\phi$" and insert -- $\Delta\varphi$ --, therefor.

In Column 7, Line 57, delete "$\Delta\theta$" and insert -- $\Delta\vartheta$ --, therefor.

In Column 7, Line 61, delete "$\Delta\phi$" and insert -- $\Delta\varphi$ --, therefor.

In Column 7, Line 61, delete "$\Delta\theta$" and insert -- $\Delta\vartheta$ --, therefor.

Signed and Sealed this
Fourth Day of April, 2017

Michelle K. Lee
*Director of the United States Patent and Trademark Office*